May 7, 1968  B. M. BAKER  3,382,481

CANTILEVER MOUNTED HYDROPHONE

Filed June 24, 1966

INVENTOR
BUFORD M. BAKER

ATTORNEY

# United States Patent Office 3,382,481
Patented May 7, 1968

3,382,481
CANTILEVER MOUNTED HYDROPHONE
Buford M. Baker, Dallas, Tex., assignor to Texas Instruments Incorporated, Dallas, Tex., a corporation of Delaware
Filed June 24, 1966, Ser. No. 560,130
7 Claims. (Cl. 340—17)

ABSTRACT OF THE DISCLOSURE

A marine seismometer insensitive to cable strumming forces wherein a liquid-filled flexible housing is provided with a resilient cantilever support for a pressure-responsive detector to form a vibratory mounting resonant at about 5 cycles per second.

---

Figure 1:
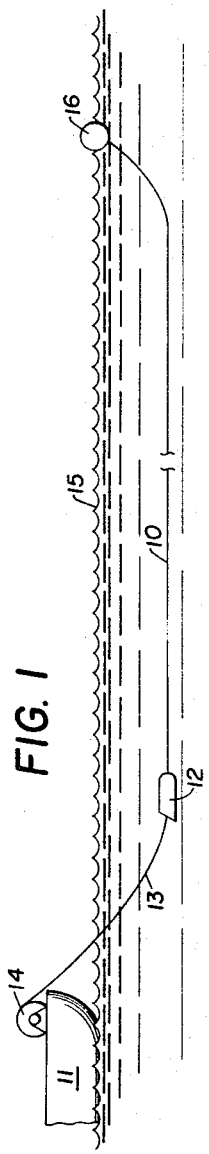

This invention relates to marine seismometers or hydrophones and more particularly to a cantilever mounted hydrophone suspension which provides vibration isolation.

Heretofore, hydrophones for use in marine seismic operations have been packaged in elongated streamers. Such streamers are towed behind a vessel for detecting seismic waves produced by detonation of an explosive charge beneath the water's surface. It has been a common experience to find that the received seismic waves are masked or distorted by vibrations created by the towing vessel and by "strumming" of the lead-in cable extending from the nose of a marine seismic cable to the towing vessel. It has been found desirable to isolate the hydrophone from such mechanically induced vibrations so that the seismic waves can be faithfully translated into electrical signals.

It is generally the practice to provide the seismic cable containing hydrophones with structure at the nose of the cable which hydrodynamically causes the cable to assume a predetermined depth of, for example, 40 feet below the surface as towing forces are applied from a boat. As a result, the lead-in cable extending from the depressor to the boat undergoes a strumming action. That is, it vibrates as a taut spring, thereby applying undesirable forces to the seismic cable.

The present invention is directed to isolation of the hydrophone from such vibrations. The tugging action of the ship, due to wave motion, as well as the strumming of the highly stressed lead-in cable as it cuts laterally through the water, constitute noise sources. Extremely minute vertical displacements of the hydrophone have been found to generate noise signals due to the hydrostatic head change. Both the piezoelectric and magnetostrictive elements are employed in hydrophones as pressure sensitive devices. The acceleration forces associated with a small displacement in any direction also creates a strain on a piezoelectric crystal, for example, as to generate a significant noise signal.

It is an objective of this invention to reduce mechanically induced noise in a desired frequency band by utilizing, in a hydrophone array, an elastic suspension of mechanical dynamic nature such that the physical displacement of the hydrophone reacting to a forcing function is greatly reduced or eliminated in the frequency band of interest.

More particularly, in accordance with the present invention, there is provided a hydrophone suspension in which a flexible cylindrical tube has a cylindrical support block rigidly secured therein. A resilient supporting rod is cantilever mounted at one end in the support block. A cylindrical pressure transducer is mounted on the free end of the rod. Circuit means complete an electrical circuit through the block to the transducer. A transmission fluid fills the tube for coupling sound waves through the tube to the transducer.

Figure 2:
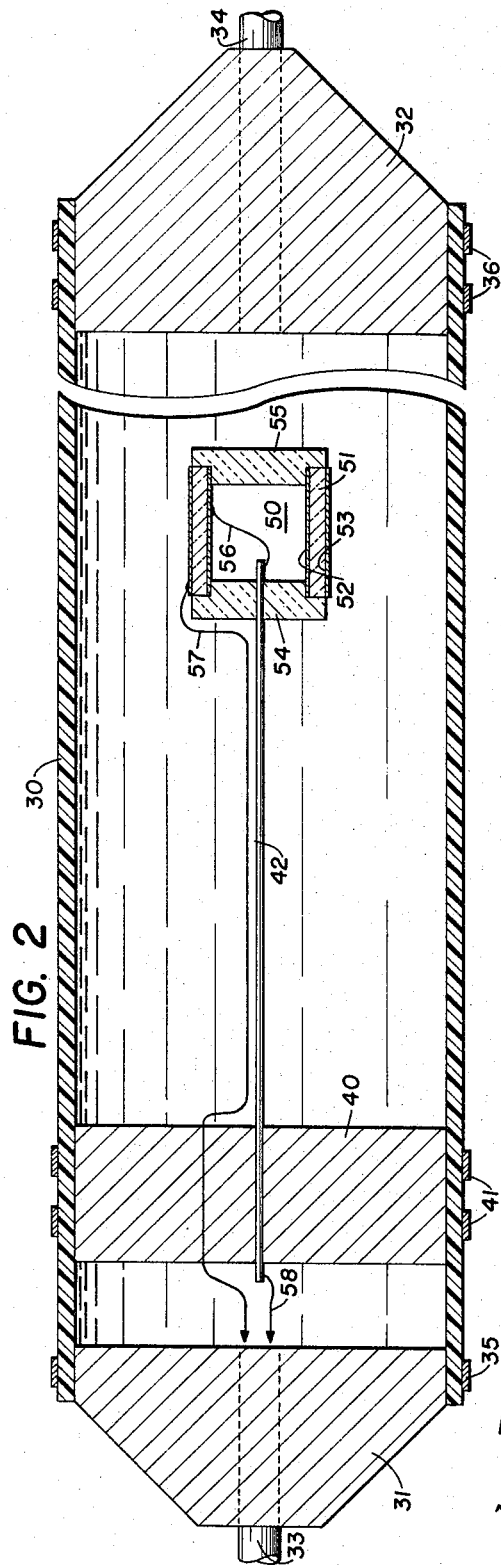
Figure 3:
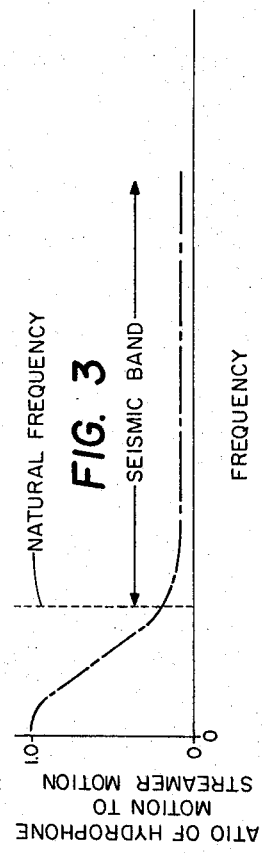

For a more complete understanding of the present invention, reference may now be had to the following description taken in conjunction with the accompanying drawings in which:

FIGURE 1 diagrammatically illustrates the towing configuration of a marine seismic streamer;

FIGURE 2 is a sectional view of the streamer of FIGURE 1 showing a mounting for one transducer; and FIGURE 3 is a plot of the response of the system of FIGURE 2.

Referring now to FIGURE 1, a marine seismic streamer 10 is towed by a boat 11. A hydrodynamic depressor 12 is connected to the front end of the streamer 10. A lead-in cable 13 extends from the depressor 12 to a reel 14 carried by boat 11. Towing forces are thus applied to the streamer 10. As such forces are applied, the depressor 12 serves to maintain the cable at a predetermined depth below the surface 15. A marker buoy 16 is connected to the trailing end of the streamer 10 and serves to indicate the location of the trailing end of the streamer.

In practice, the streamer 10 may include detectors for twenty-four data channels. Each data channel may comprise ten hydrophones mounted in a flexible hollow tube of about one hundred feet in length. Signals from the hydrophones in such length are then summed and applied by way of conductors leading through the streamer and through the lead-in cable 13 to a recording system on the boat 11, whereby a multichannel seismogram can be recorded. Seismic waves detected by the hydrophones in streamer 10 are recorded as time varying electrical signals relative to the origin of a given seismic event such as the instant of detonation of an explosive charge.

In general the construction of pressure responsive marine seismic streamers is well known, as represented by U.S. Patent No. 2,465,696 to Paisley.

The present invention is directed to isolation of the hydrophone from transverse forces other than the desired seismic waves which tend to move the hydrophone and generate unwanted noise signals.

Referring now to FIGURE 2, a hydrophone from the system of FIGURE 1 has been shown in section and comprises an elongated resilient cylindrical section 30 of the streamer 10. Plugs 31 and 32 close the ends of the section 30. The cable 33 extending into plug 32 may be a multiconductor cable extending forward into additional sections. Similarly, the cable 34 extends rearwardly to tow additional sections. The cable termination has not been shown in detail, nor has the coupling between cables 33 and 34 been detailed, such provisions being well known in the art.

The end plugs 31 and 32 are secured in the ends of the tube 30 by clamping rings 35 and 36, respectively.

A short cylindrical support block 40 is mounted adjacent to the nose plug 31 and is of rigid material secured within the jacket 30 by clamping bands or rings 41. A suspension spring or support rod 42 is cantilever mounted and extends rearwardly from the support block 40. A pressure detector 50 is mounted on the free end of the support rod 42.

The pressure detector 50 comprises a piezoelectric crystal 51 having an inner electrode 52 and an outer electrode 53. The crystal 51 is in the form of a short cylinder and is fitted with end plugs 54 and 55. The rod 42 is rigidly secured at its free end in the plug 54 thereby to support the transducer 50. A conductor 56 extends from the end of rod 42 to the inner electrode 53. A conductor 57 is connected to the outer electrode 53 and extends through the support block 40 to suitable circuits in the cable 33. Similarly, a conductor 58 connected to the supported end of the rod 42 is connected to a cable conductor.

In FIGURE 3, the ratio of the amplitude of motion of the detector 50 thus mounted relative to the motion of the tube 30 has been plotted. Above the resonant frequency of the cantilever supported detector 50, the motion of the detector 50 is very low relative to the motion of the tube 30. In practice, the resonant frequency of the suspension will preferably be of the order of about 5 cycles per second so that all motion of the housing within the seismic frequency band will not induce undesired signals into the detector 50. At the same time, the tube 30 is filled with a liquid such that the pressure waves impinging the hydrophone will be transmitted through the walls of the tube 30 into the liquid and thus to the detector 50.

The tube 30 may be made of flexible polyvinyl chloride with longitudinal reinforcement provided by nylon cords therein. The piezoelectric cylinder 51 may be provided with phenolic end caps 54 and 55 which are coupled to cylinder 51 as to form a unitary structure by use of a suitable epoxy cement.

While a single support block 40 has been shown, it will be understood that the tube 30 may be of the order of 100 feet in length and that a plurality of such blocks and supported hydrophones would be included within a single streamer. The hydrophones within a given streamer may then be interconnected electrically so that the sum of the signals produced thereby will be applied from such a unit to recorded systems.

Having described the invention in connection with certain specific embodiments thereof, it is to be understood that further modifications may now suggest themselves to those skilled in the art and it is intended to cover such modifications as fall within the scope of the appended claims.

What is claimed is:
1. In a hydrophone, the combination which comprises:
    (a) a flexible cylindrical tube in which strumming motion is induced as it is towed endwise through a water body,
    (b) a cylindrical support block rigidly secured in said tube,
    (c) a resilient supporting rod cantilever mounted at one end in said block,
    (d) a cylindrical pressure transducer mounted on the free end of said rod to form with said rod a vibratory suspension through which said motion will not be transmitted,
    (e) means for completing an electrical circuit through said block to said transducer, and
    (f) a transmission fluid filling said tube for coupling sound waves through said tube to said transducer.
2. The combination set forth in claim 1 wherein a plurality of support blocks and transducers are positioned at spaced points along and within said tube.
3. The combination set forth in claim 1 wherein rigid end plugs are secured in opposite ends of said transducer and wherein said rod is secured to at least one of said end plugs.
4. The combination set forth in claim 1 wherein the resonant frequency of said transducer as mounted in said rod relative to said support block is about 5 cycles per second.
5. In a hydrophone, the combination which comprises:
    (a) an elongated flexible cylindrical tube having transmission fluid therein and subject to induced motion upon travel endwise through a water environment,
    (b) a resilient support rod cantilever mounted at one end at the axis of said tube, and
    (c) a cylindrical pressure transducer mounted on the free end of said rod to give said rod a natural frequency of vibration in said tube at about 5 cycles per second to render said transducer insensitive to said motion.
6. The combination set forth in claim 5 wherein the axis of said transducer is parallel to the axis of said tube.
7. A pressure responsive seismometer having strumming vibration isolation which comprises:
    (a) a pressure responsive detector in a sound transmitting housing which housing is subject to induced motion by travel endwise through a water environment,
    (b) support means for resiliently mounting said transducer in said housing, said support means and said transducer forming a suspension having about a 5 cycle per second natural resonant frequency to render said detector insensitive to said motion, and
    (c) means for communicating signals from said transducer.

References Cited

UNITED STATES PATENTS 2,875,352   2/1959   Orlacchio _____ 310—8.1
3,290,654   12/1966  Pavey et al. _____ 340—17 X BENJAMIN A. BORCHELT, *Primary Examiner.*

P. A. SHANLEY, W. KUJAWA, *Assistant Examiners.*